(12) United States Patent
Cui et al.

(10) Patent No.: US 11,641,497 B2
(45) Date of Patent: May 2, 2023

(54) METHOD AND DEVICE FOR DETECTING AVAILABLE BANDWIDTH BASED ON BURSTINESS OF KEY FRAME OF VIDEO STREAM

(71) Applicant: Tsinghua University, Beijing (CN)

(72) Inventors: Yong Cui, Beijing (CN); Ziyi Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/729,864

(22) Filed: Apr. 26, 2022

(65) Prior Publication Data

US 2022/0360829 A1 Nov. 10, 2022

(30) Foreign Application Priority Data

Apr. 28, 2021 (CN) .......................... 202110466249.1

(51) Int. Cl.
*H04N 21/2385* (2011.01)
*H04N 21/845* (2011.01)
*H04N 21/8547* (2011.01)

(52) U.S. Cl.
CPC ..... *H04N 21/2385* (2013.01); *H04N 21/8455* (2013.01); *H04N 21/8547* (2013.01)

(58) Field of Classification Search
None
See application file for complete search history.

(56) References Cited

U.S. PATENT DOCUMENTS

| 7,113,486 | B2* | 9/2006 | Schwartz | H04N 21/2381 |
| | | | | 375/E7.278 |
| 9,106,787 | B1* | 8/2015 | Holmer | H04N 19/172 |
| 2017/0094301 | A1* | 3/2017 | Gu | H04N 19/503 |
| 2019/0394121 | A1* | 12/2019 | Wang | H04L 43/16 |

* cited by examiner

*Primary Examiner* — Jason K Lin
(74) *Attorney, Agent, or Firm* — Hodgson Russ LLP

(57) ABSTRACT

A method for detecting an available bandwidth based on a burstiness of a key frame of a video stream, includes: establishing a video connection between a sender and a receiver, and sending the video stream by the sender to the receiver; recording a sending timestamp of each packet at the sender; recording a receiving timestamp of each packet received by the receiver; calculating a difference between the receiving timestamp and the sending timestamp of each packet, and obtaining the packet with the smallest difference and the packet with the greatest difference by traversing the packets in the key frame; and estimating a currently available bandwidth according to the packet with the smallest difference and the packet with the greatest difference.

6 Claims, 2 Drawing Sheets

METHOD AND DEVICE FOR DETECTING AVAILABLE BANDWIDTH BASED ON BURSTINESS OF KEY FRAME OF VIDEO STREAM

CROSS-REFERENCE TO RELATED APPLICATIONS

This application is based on and claims priority to Chinese Patent Application Serial No. 202110466249.1, filed on Apr. 28, 2021, the entire contents of which is incorporated herein by reference.

FIELD

The present disclosure relates to the technical field of bandwidth detection in a transmission direction of Internet streaming media, in particular to a method and device for detecting an available bandwidth based on a burstiness of a key frame of a video stream.

BACKGROUND

Prediction of future bandwidth is a classic problem in the streaming media field, and it is also an important input for adaptive bitrate adjustment algorithms. Previous studies have mainly used time series models, machine learning models and data-driven models to optimize the prediction process. However, since the input of the prediction process, that is, the collected historical throughput value, is usually lower than the available bandwidth, the future available bandwidth value predicted based on the historical data is often lower than the actual value. On the other hand, some studies either adopt the method of actively sending probe data, or add proxy devices to detect the rapidly changing and unstable network available bandwidth, which not only increases the overhead, but also exacerbates the difficulty of deployment in practical scenarios. Furthermore, throughput measurements can only approximate the true available bandwidth if the network link is fully utilized. Although downloaded video clips in an on-demand scenario may fill up the network link, in a live broadcast/video conference scenario, the sender only sends packets after the video frame is generated. In this case, if the available bandwidth is estimated from the measured average throughput, the predicted value will actually be lower than the true value.

SUMMARY

In a first aspect, a method for detecting an available bandwidth based on a burstiness of a key frame of a video stream is provided. The method includes:
establishing a video connection between a sender and a receiver, and sending the video stream by the sender to the receiver;
recording a sending timestamp of each packet at the sender;
recording a receiving timestamp of each packet received by the receiver;
calculating a difference between the receiving timestamp and the sending timestamp of each packet, and obtaining the packet with the smallest difference and the packet with the greatest difference by traversing the packets in the key frame; and
estimating a currently available bandwidth according to the packet with the smallest difference and the packet with the greatest difference,
wherein estimating the currently available bandwidth according to the packet with the smallest difference and the packet with the greatest difference comprises:

$$\text{Avai\_bwd} = \frac{Data_{Keyframe}}{(recv_j - send_j) - (recv_i - send_i)}$$

where, Avai_bwd is the currently available bandwidth, $Data_{Keyframe}$ is a total size of the key frame, i is the packet with the smallest difference, j is the packet with the greatest difference, $recv_i$ and $recv_j$ are the receiving timestamps when the receiver receives the packets i and j, and $send_i$ and $send_j$ are the sending timestamps when the sender sends the packets i and j.

In a second aspect, a device for detecting an available bandwidth based on a burstiness of a key frame of a video stream is provided. The device includes:
a processor; and
a memory, configured to store instructions executable by the processor,
wherein the processor is configured to:
establish a video connection between a sender and a receiver, wherein the video stream is sent by the sender to the receiver;
record a sending timestamp of each packet at the sender;
record a receiving timestamp of each packet received by the receiver;
calculate a difference between the receiving timestamp and the sending timestamp of each packet, and obtain the packet with the smallest difference and the packet with the greatest difference by traversing the packets in the key frame; and
estimate a currently available bandwidth according to the packet with the smallest difference and the packet with the greatest difference,
wherein estimating the currently available bandwidth according to the packet with the smallest difference and the packet with the greatest difference comprises:

$$\text{Avai\_bwd} = \frac{Data_{Keyframe}}{(recv_j - send_j) - (recv_i - send_i)}$$

where, Avai_bwd is the currently available bandwidth, $Data_{Keyframe}$ is a total size of the key frame, i is the packet with the smallest difference, j is the packet with the greatest difference, $recv_i$ and $recv_j$ are the receiving timestamps when the receiver receives the packets i and j, and $send_i$ and $send_j$ are the sending timestamps when the sender sends the packets i and j.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
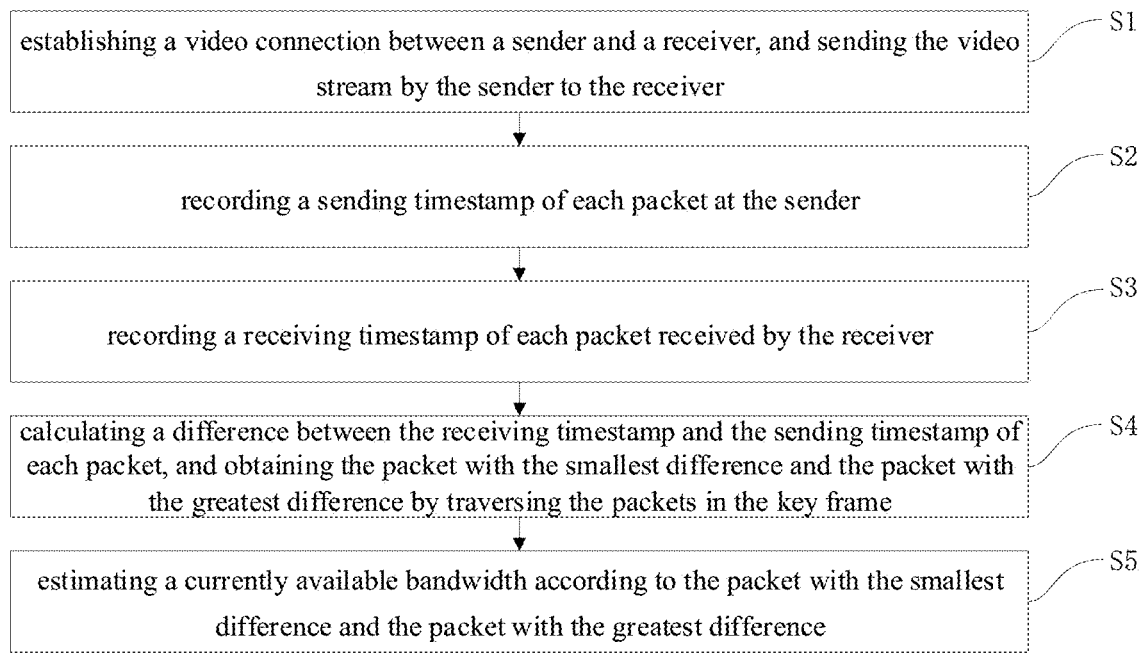
FIG. 1 is a flowchart of a method for detecting an available bandwidth based on a burstiness of a key frame of a video stream according to embodiments of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and device for detecting an available bandwidth based on a burstiness of a key frame of a video stream according to embodiments of the present disclosure will be described below with reference to the accompanying drawings.

First, the method for detecting an available bandwidth based on a burstiness of a key frame of a video stream proposed according to an embodiment of the present invention will be described with reference to the accompanying drawings.

The upper limit of the available bandwidth is passively detected by using the burstiness of the key frame in the video stream without incurring any transmission overhead. Specifically, in video streaming, each encoded video stream contains some key frames and many non-key frames. A key frame, also known as an intra-coded frame, is a frame in a data stream that stores a complete image. The key frame is the least compressible and does not depend on other video frames when decoding. Compared to key frames, non-key frames rely on data from previous frames for decoding and are more compressible. Usually, the key frame has a large amount of data and has a burstiness (tens of packets at a time). Therefore, the present disclosure chooses to passively probe the available bandwidth using the burstiness of the key frame.

FIG. 1 is a flowchart of a method for detecting an available bandwidth based on a burstiness of a key frame of a video stream according to embodiments of the present disclosure.

As illustrated in FIG. 1, the method includes following steps.

In step S1, a video connection is established between a sender and a receiver, and a video stream is sent to the receiver by the sender.

In detail, a sender application establishes a video connection with a receiver application through a transport layer protocol.

In step S2, a sending timestamp of each packet of the sender is recorded.

The sender records the sending timestamp $send_i$ of each packet in the video stream.

In step S3, a receiving timestamp of each packet received by the receiver is recorded.

It could be understood that the receiver sends a feedback ACK packet to the sender after receiving the packet, and adds the receiving timestamp $send_i$ of the receiver to the feedback ACK packet.

In step S4, a difference between the receiving timestamp and the sending timestamp of each packet is calculated, and the packet with the smallest difference and the packet with the greatest difference are obtained by traversing all the packets in the current key frame.

In step S5, a currently available bandwidth is estimated according to the packet with the smallest difference and the packet with the greatest difference.

Specifically, the sender obtains the feedback ACK packet of each packet, and calculates the difference between the receiving timestamp and the sending timestamp.

Further, all the packets in the current key frame are traversed, and the packet i with the smallest difference between the receiving timestamp and the sending timestamp and the packet j with the greatest difference are obtained, and the corresponding differences are $recv_i-send_i$ and $recv_j-send_j$.

It should be noted that, in embodiments of the present disclosure, statistics and calculations are not performed for non-key frames.

Figure 2:
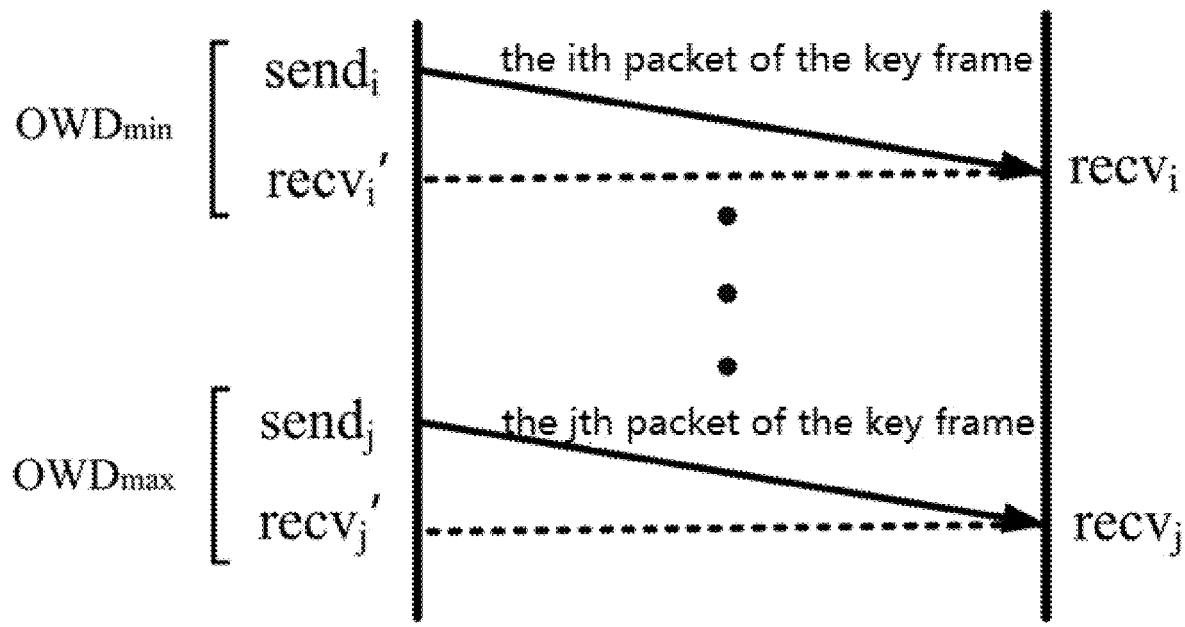
FIG. 2 is a schematic diagram of packet delay according to an embodiment of the present disclosure.

Specifically, the key frame has burstiness and contains dozens of packets. All packets in the same keyframe are assumed to have the same length (maximum transmission unit). First, one-way delays (OWDs) of all packets belonging to the same key frame are acquired. The OWD consists of four main components: processing delay (the time to check the packet), queuing delay (the time to wait at the output port to be sent), transmission delay (the time to bring the packet into the link), and propagation delay (the time of propagation on the physical link). In general, all packets of the same key frame experience the same processing delay, transmission delay, and propagation delay. The only difference is the queuing delay. In embodiments of the present disclosure, the packet i with the smallest one-way delay (packet at the head of the burst packet group) and the packet j with the greatest one-way delay (packet at the end of the burst packet group) are found. The difference between $OWD_{max}$ and $OWD_{min}$ is the difference between the queuing delays of packet i and packet j, which is also the cumulative transmission delay of the entire key frame from the network port to the network link, as shown in FIG. 2. The available bandwidth is reflected by dividing the total size of the key frame (in bytes) by this difference, which is higher than the bandwidth value calculated by averaging the key frames and non-key frames, and more close to the real value. Specifically, the sending timestamp of packet i is recorded as $send_i$. The receiver records the arrival timestamp of the packet as $recv_i$, and the corresponding time of the sender is $recv'_i$, then the sending delay of the key frame is:

$\Delta OWD = OWD_{max} - OWD_{min}$
$= (recv'_j - send_j) - (recv'_i - send_i)$
$= [(recv_j - send_j) + (recv'_j - recv_j)] - [(recv_i - send_i) + (recv'_i - recv_i)]$
$= (recv_j - send_j) - (recv_i - send_i)$ Since both $OWD_{max}$ and $OWD_{min}$ include the clock difference between the sender and receiver, using subtraction can remove the clock difference on both ends, thus avoiding clock synchronization problems. Additionally, this converts the input for the $\Delta OWD$ calculation into readily available data, to estimate the available bandwidth:

$$Avai\_bwd = \frac{Data_{Keyframe}}{\Delta OWD} = \frac{Data_{Keyframe}}{(recv_j - send_j) - (recv_i - send_i)}$$

where, Avai_bwd is the currently available bandwidth, $Data_{Keyframe}$ is a total size of the key frame, i is the packet with the smallest difference, j is the packet with the greatest difference, $recv_i$ and $recv_j$ are the receiving timestamps when the receiver receives the packets i and j, and $send_i$ and $send_j$ are the sending timestamps when the sender sends the packets i and j.

According to the method for detecting an available bandwidth based on a burstiness of a key frame of a video stream proposed by the embodiment of the present disclosure, the video connection is established between the sender and the receiver, and the video stream is sent to the receiver through the sender; the sending timestamp of each packet of the sender is recorded; the receiving timestamp of each packet received by the receiver is recorded; the difference between the receiving timestamp and the sending timestamp of each packet is calculated, and the packet with the smallest difference and the packet with the greatest difference are obtained by traversing all the packets in the current key frame; the currently available bandwidth is estimated based on the packet with the smallest difference and the packet with the greatest difference. Therefore, the upper limit of the available bandwidth can be passively detected by using the burstiness of the key frame in the video stream without additional transmission overhead, which can utilize the network bandwidth more effectively than the algorithm that uses the average throughput to estimate.

Next, the device for detecting an available bandwidth based on a burstiness of a key frame of a video stream proposed according to an embodiment of the present invention will be described with reference to the accompanying drawings.

Figure 3:
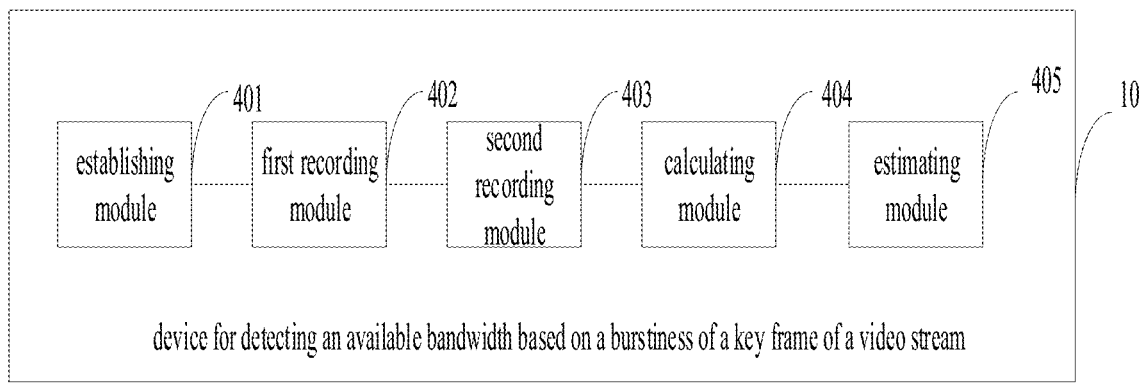
FIG. 3 is a block diagram of a device for detecting an available bandwidth based on a burstiness of a key frame of a video stream according to embodiments of the present disclosure.

FIG. 3 is a block diagram of a device for detecting an available bandwidth based on a burstiness of a key frame of a video stream according to embodiments of the present disclosure.

As illustrated in FIG. 3, the device includes an establishing module 401, a first recording module 402, a second recording module 403, a calculating module 404 and an estimating module 405.

The establishing module 401 is configured to establish a video connection between a sender and a receiver, wherein the video stream is sent by the sender to the receiver.

The first recording module 402 is configured to record a sending timestamp of each packet at the sender.

The second recording module 403 is configured to record a receiving timestamp of each packet received by the receiver.

The calculating module 404 is configured to calculate a difference between the receiving timestamp and the sending timestamp of each packet, and obtain the packet with the smallest difference and the packet with the greatest difference by traversing the packets in the key frame.

The estimating module 405 is configured to estimate a currently available bandwidth according to the packet with the smallest difference and the packet with the greatest difference.

Further, estimating the currently available bandwidth according to the packet with the smallest difference and the packet with the greatest difference includes:

$$Avai\_bwd = \frac{Data_{Keyframe}}{(recv_j - send_j) - (recv_i - send_i)}$$

where, Avai_ bwd is the currently available bandwidth, $Data_{Keyframe}$ is a total size of the key frame, i is the packet with the smallest difference, j is the packet with the greatest difference, $recv_i$ and $recv_j$ are the receiving timestamps when the receiver receives the packets i and j, and $send_i$ and $send_j$ are the sending timestamps when the sender sends the packets i and j.

Further, the receiver is configured to send a feedback packet to the sender after receiving the packet, wherein the receiving timestamp of the receiver is added to the feedback packet.

Further, the video connection is established between the sender and the receiver through a transport layer protocol.

According to the device for detecting an available bandwidth based on a burstiness of a key frame of a video stream proposed by the embodiment of the present disclosure, the video connection is established between the sender and the receiver, and the video stream is sent to the receiver through the sender; the sending timestamp of each packet of the sender is recorded; the receiving timestamp of each packet received by the receiver is recorded; the difference between the receiving timestamp and the sending timestamp of each packet is calculated, and the packet with the smallest difference and the packet with the greatest difference are obtained by traversing all the packets in the current key frame; the currently available bandwidth is estimated based on the packet with the smallest difference and the packet with the greatest difference. Therefore, the upper limit of the available bandwidth can be passively detected by using the burstiness of the key frame in the video stream without additional transmission overhead, which can utilize the network bandwidth more effectively than the algorithm that uses the average throughput to estimate.

Embodiments of the present disclosure further provide a device for detecting an available bandwidth based on a burstiness of a key frame of a video stream. The device includes a processor and a memory. The memory is configured to store instructions executable by the processor. The processor is configured to implement the method for detecting an available bandwidth based on a burstiness of a key frame of a video stream described above by executing the instructions stored in the memory.

It should be noted that the foregoing explanations of the method embodiment are also applicable to the device of this embodiment, and details are not repeated here.

The terms "first" and "second" are only used for descriptive purposes, and should not be construed as indicating or implying relative importance or implicitly indicating the number of technical features indicated. Thus, a feature delimited with "first", "second" may expressly or implicitly include at least one of that feature. In the description of the present disclosure, "plurality" means at least two, such as two, three, etc., unless otherwise expressly and specifically defined.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, modifications, alternations, and variations can be made to the embodiments within the scope of the present disclosure.

What is claimed is:

1. A method for detecting an available bandwidth based on a burstiness of a key frame of a video stream, comprising:
  establishing a video connection between a sender and a receiver, and sending the video stream by the sender to the receiver;
  recording a sending timestamp of each packet at the sender;
  recording a receiving timestamp of each packet received by the receiver;
  calculating a difference between the receiving timestamp and the sending timestamp of each packet, and obtaining a packet with a smallest difference and a packet with a greatest difference by traversing the packets in the key frame; and
  estimating a currently available bandwidth according to the packet with the smallest difference and the packet with the greatest difference,
  wherein estimating the currently available bandwidth according to the packet with the smallest difference and the packet with the greatest difference comprises:

$$\text{Avai\_bwd} = \frac{Data_{Keyframe}}{(recv_j - send_j) - (recv_i - send_i)}$$

where, Avai_bwd is the currently available bandwidth, $Data_{Keyframe}$ is a total size of the key frame, i is the packet with the smallest difference, j is the packet with the greatest difference, $recv_i$ and $recv_j$ are the receiving timestamps when the receiver receives the packets i and j, and $send_i$ and $send_j$ are the sending timestamps when the sender sends the packets i and j.

2. The method according to claim 1, further comprising:
  sending a feedback packet by the receiver to the sender after receiving the packet, wherein the receiving timestamp of the receiver is added to the feedback packet.

3. The method according to claim 1, wherein the video connection is established between the sender and the receiver through a transport layer protocol.

4. A device for detecting an available bandwidth based on a burstiness of a key frame of a video stream, comprising:
  a processor; and
  a memory, configured to store instructions executable by the processor,
  wherein the processor is configured to:
    establish a video connection between a sender and a receiver, wherein the video stream is sent by the sender to the receiver;
    record a sending timestamp of each packet at the sender;
    record a receiving timestamp of each packet received by the receiver;
    calculate a difference between the receiving timestamp and the sending timestamp of each packet, and obtain a packet with a smallest difference and a packet with a greatest difference by traversing the packets in the key frame; and
    estimate a currently available bandwidth according to the packet with the smallest difference and the packet with the greatest difference,
  wherein estimating the currently available bandwidth according to the packet with the smallest difference and the packet with the greatest difference comprises:

$$\text{Avai\_bwd} = \frac{Data_{Keyframe}}{(recv_j - send_j) - (recv_i - send_i)}$$

where, Avai_bwd is the currently available bandwidth, $Data_{Keyframe}$ is a total size of the key frame, i is the packet with the smallest difference, j is the packet with the greatest difference, $recv_i$ and $recv_j$ are the receiving timestamps when the receiver receives the packets i and j, and $send_i$ and $send_j$ are the sending timestamps when the sender sends the packets i and j.

5. The device according to claim 4, wherein the receiver is configured to send a feedback packet to the sender after receiving the packet, wherein the receiving timestamp of the receiver is added to the feedback packet.

6. The device according to claim 4, wherein the video connection is established between the sender and the receiver through a transport layer protocol.

* * * * *